United States Patent [19]

Biery

[11] Patent Number: 4,527,940
[45] Date of Patent: Jul. 9, 1985

[54] CHEESE UNLOADING MACHINE

[75] Inventor: Dennis H. Biery, Louisville, Ohio

[73] Assignee: Biery Cheese Company, Louisville, Ohio

[21] Appl. No.: 523,016

[22] Filed: Aug. 15, 1983

[51] Int. Cl.³ .......................................... B65G 65/23
[52] U.S. Cl. .................................. 414/416; 414/118; 414/120; 414/420; 414/422; 425/439
[58] Field of Search .............. 414/416, 420, 422, 118, 414/120; 425/405 R, 436 R, 436 RM, 439; 198/403, 486

[56] References Cited

U.S. PATENT DOCUMENTS

| 2,365,007 | 12/1944 | Rideout et al. | 414/421 |
| 2,757,810 | 8/1956 | Aukens | 414/422 |
| 2,781,139 | 2/1957 | Gordon et al. | 414/412 |
| 3,263,842 | 8/1966 | Holstein | 414/422 X |
| 3,314,554 | 4/1967 | Cuniberti | 198/486 X |
| 3,753,509 | 8/1973 | Kock | 414/416 |
| 3,780,884 | 12/1973 | Jones | 414/118 |
| 3,809,265 | 5/1974 | Krenke | 414/416 |
| 3,895,722 | 7/1975 | Pluntz | 198/403 X |
| 4,139,593 | 2/1979 | Holz et al. | 264/333 |
| 4,154,438 | 5/1979 | Seragnoli | 271/102 X |
| 4,328,657 | 5/1982 | Brandmaier et al. | 271/102 X |
| 4,355,936 | 10/1982 | Thomas et al. | 414/118 |
| 4,451,191 | 5/1984 | Torre | 414/118 |

FOREIGN PATENT DOCUMENTS

1423958 2/1976 United Kingdom ............... 414/416

Primary Examiner—Robert J. Spar
Assistant Examiner—Stuart J. Millman
Attorney, Agent, or Firm—Michael Sand Co.

[57] ABSTRACT

A machine for automatically removing a block of cheese from a container having an open top by inverting the container and pulling the cheese through the inverted open top by retractable suction cups. The cheese containers are vertically stacked on a hydraulic lift which raises the containers to an elevated position where the topmost container is gripped by a plurality of pressure actuated clamps. The clamps are mounted on a horizontal frame which is pivoted through a 180° vertical arc to invert the clamped container so that the heretofore open top becomes an open bottom. A plurality of suction cups are mounted on a vertically movable conveyor which is located beneath the container when the container is in the inverted position. The conveyor and suction cups are raised to a position closely adjacent the open bottom of the container by pressure actuated cylinders and the suction cups engage the block of cheese. Retraction of the suction cups pulls the cheese from the container and deposits the cheese on the conveyor. The conveyor then is lowered to a position adjacent a transfer conveyor and the cheese is moved onto the transfer conveyor for movement to a subsequent processing station.

14 Claims, 11 Drawing Figures

CHEESE UNLOADING MACHINE

TECHNICAL FIELD

The invention relates to equipment used in the cheese processing field and in particular to a machine for automatically removing blocks of cheese from containers. More particularly, the invention relates to a cheese unloading machine which automatically inverts open-top containers in which large blocks of cheese are shipped, and then removes the cheese from the container by an extractor onto a conveyor for transfer to a subsequent processing station.

BACKGROUND ART

Various varieties of cheese are shipped in large containers from a cheese production site to different sites for further processing and repackaging into smaller packages for retail and wholesale sales and distribution. These shipping containers are relatively large rectangular-shaped wooden boxes approximately eight inches deep and thirty-two by twenty-eight inches in dimension. The cheese is sealed in a tough plastic wrap prior to placement in the shipping container and will settle during shipment to an extent that it conforms and presses tightly against the sides of the container.

These blocks of cheese weigh approximately two hundred pounds and are difficult to remove from the shipping containers without damaging the container and/or cheese due to the weight of the cheese and container, and because the cheese has expanded against the sides of the container, rigidly securing the cheese inside of the container. Heretofore, two men were required to remove these blocks of cheese from the container. The men would manually turn the container upside down and then by pounding the container sides and bottom with rubber mallets would eventually loosen the cheese causing it to drop from the container. Such removal method resulted in high labor cost and was time consuming and difficult.

Therefore, the need has existed for an improved machine which automatically removes the blocks of cheese from such containers in a simple, economic and efficient manner without damaging the container and cheese removed therefrom.

DISCLOSURE OF THE INVENTION

Objectives of the invention include providing an improved machine which enables large blocks of cheese to be removed automatically and conveniently from the shipping containers without damaging the shipping container and cheese even though the cheese has settled during shipment and has expanded against the sides of the container. Another objective is to provide such a machine in which a plurality of cheese-filled containers may be stacked on the machine by a forklift truck or similar delivery vehicle eliminating manual handling of each individual container, after which stacking appropriate controls actuate a lift which delivers the cheese-filled containers to a clamping frame; and in which the clamping frame inverts the cheese and container so that the heretofore open container top becomes the container bottom, after which suction cup extractors grip the cheese and pull the cheese from the container onto a conveyor for subsequent movement to another processing station.

A still further objective of the invention is to provide such a cheese unloading machine which is constructed mainly from readily available parts, which are assembled into a relatively compact arrangement that is extremely durable, sturdy and safe to a workman operating the same; in which the actuating devices preferably are pneumatic and electrical, thereby being compatible with the compressed air and electrical system of the cheese processing plant; and in which the cheese can be removed rapidly and efficiently from the containers without damaging the containers, which then can be collected for reuse. A further objective is to provide such a machine in which the cheese loaded containers are handled entirely by power-operated equipment which eliminates the need for workmen to lift or handle the relatively heavy containers thereby reducing the possibility of injury to the workman; and in which the machine will automatically perform an entire cheese unload cycle after being actuated enabling a workman to unwrap the cheese sealing wrap from the previously discharged block of cheese or perform other operations during the unload cycle.

Another objective is to provide such a machine which substantially reduces cheese handling cost, which eliminates damaging the cheese and shipping containers, which eliminates difficulties existing in the cheese unloading art, which solves problems, satisfies needs and obtains new results in the art.

These objectives and advantages are obtained by the improved cheese unloading machine, the general nature of which may be stated as including clamp means for gripping a container having a block of cheese therein; means for inverting the clamp means and the container gripped thereby whereby the open top of the container becomes the bottom of the container; extractor means for removing the cheese through the inverted open top of the container; and means for receiving the cheese upon removal from the container by the extractor means.

BRIEF DESCRIPTION OF THE DRAWINGS

A preferred embodiment of the invention, illustrative of the best mode in which applicant has contemplated applying the principles, is set forth in the following description and shown in the drawings, and is particularly and distinctly pointed out and set forth in the appended claims.

Similar numerals refer to similars parts throughout the drawings.

BEST MODE FOR CARRYING OUT THE INVENTION

The improved cheese unloading machine is indicated generally at 1, and includes as main components a lift mechanism 2, a pivotally mounted horizontal clamping frame assembly 3, and a movable conveyor assembly 4 which contains a cheese extractor mechanism 5. Lift mechanism 2 (FIGS. 1 and 2) is of a usual construction and includes a vertically extending frame 7 mounted on a base 8. An elevator 9 is mounted on frame 7 and is moved vertically thereon by hydraulic or pneumatic cylinders (not shown) that may be controlled through line 10 which communicates with a main machine control cabinet 11. A pair of channel members 12 extend horizontally outwardly from elevator 9 on which is mounted a platform 13 (FIG. 3). Platform 13 is adapted to receive a plurality of vertically stacked cheese filled containers 15 (FIG. 11) for delivery to clamping frame assembly 3. Lift mechanism 2 may have other configurations than the structure shown in the drawings and described above without affecting the concept of the invention.

Figures 9, 11:
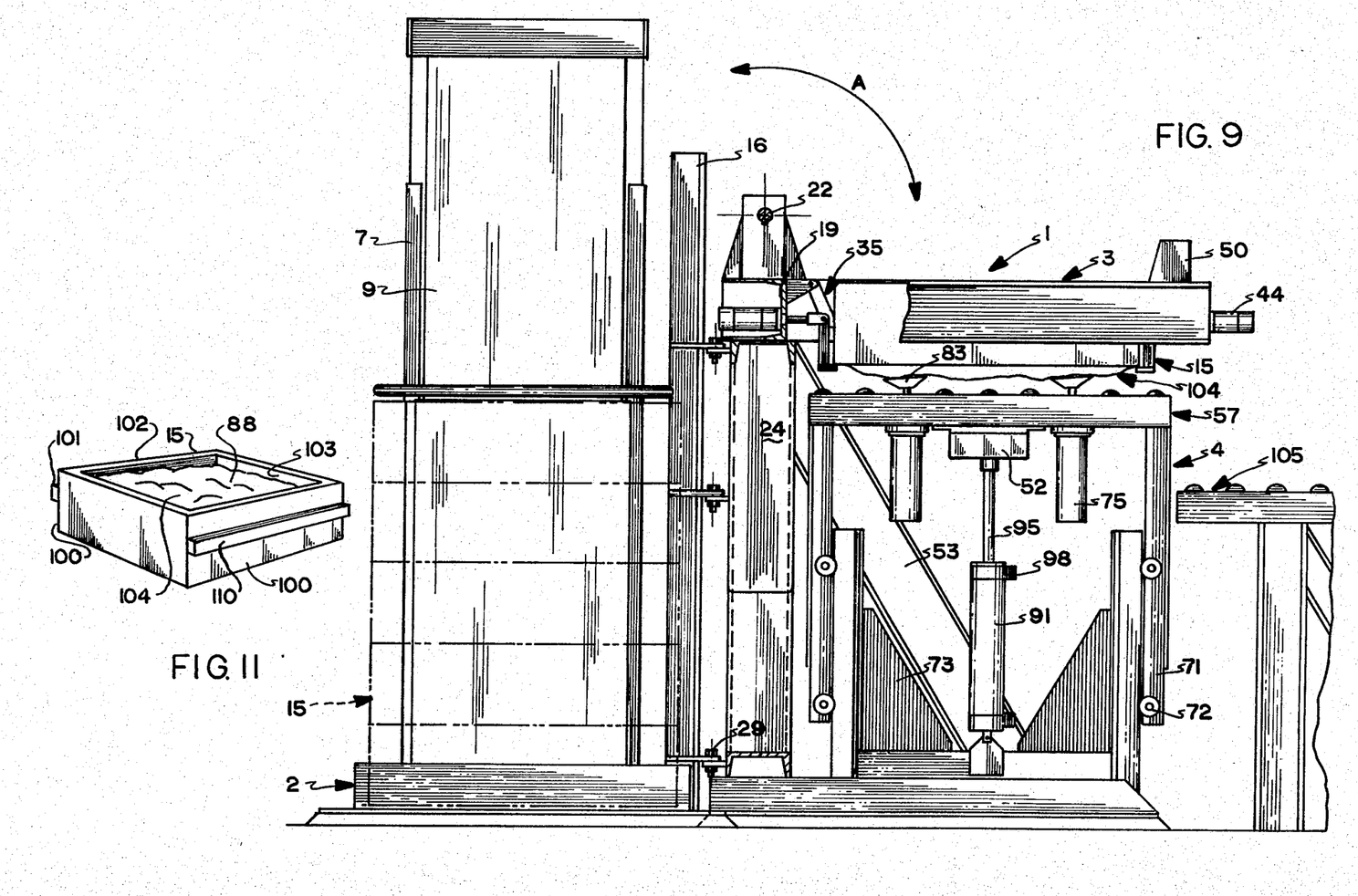
FIG. 9 is a side elevational view similar to FIG. 2, portions of which are broken away and in section, showing the pivotally mounted horizontal frame assembly rotated 180° from the position of FIG. 2, with a block of cheese being removed from an inverted container and with the movable conveyor assembly being shown in raised position.
FIG. 11 is a perspective view showing a cheese-filled container of the type to be unloaded by the machine of FIGS. 1–10.

Clamping frame assembly 3 includes a rectangular-shaped frame 17 formed by a pair of spaced, parallel end members 18 and 19 and a pair of spaced, parallel side members 20 and 21. End frame member 19 is rigidly mounted on a shaft 22 by a pair of space plates 23 and a mounting block 33 (FIGS. 1, 2 and 11) so as to rotate with shaft 22. Shaft 22 is rotatably mounted between the pair of vertically extending main supports 24 and 25 which are mounted on a base formed by a pair of horizontally extending members 27. Diagonally extending stabilizing channels 28 (FIG. 3) extend between vertical supports 24 and 25 and an upper horizontal cross channel 26. Channel 26 also functions as a stop for frame 17 when it is in the cheese discharge position as shown in FIG. 9. Another cross channel 34 extends between the lower ends of vertical supports 24 and 25.

Figures 1, 10:
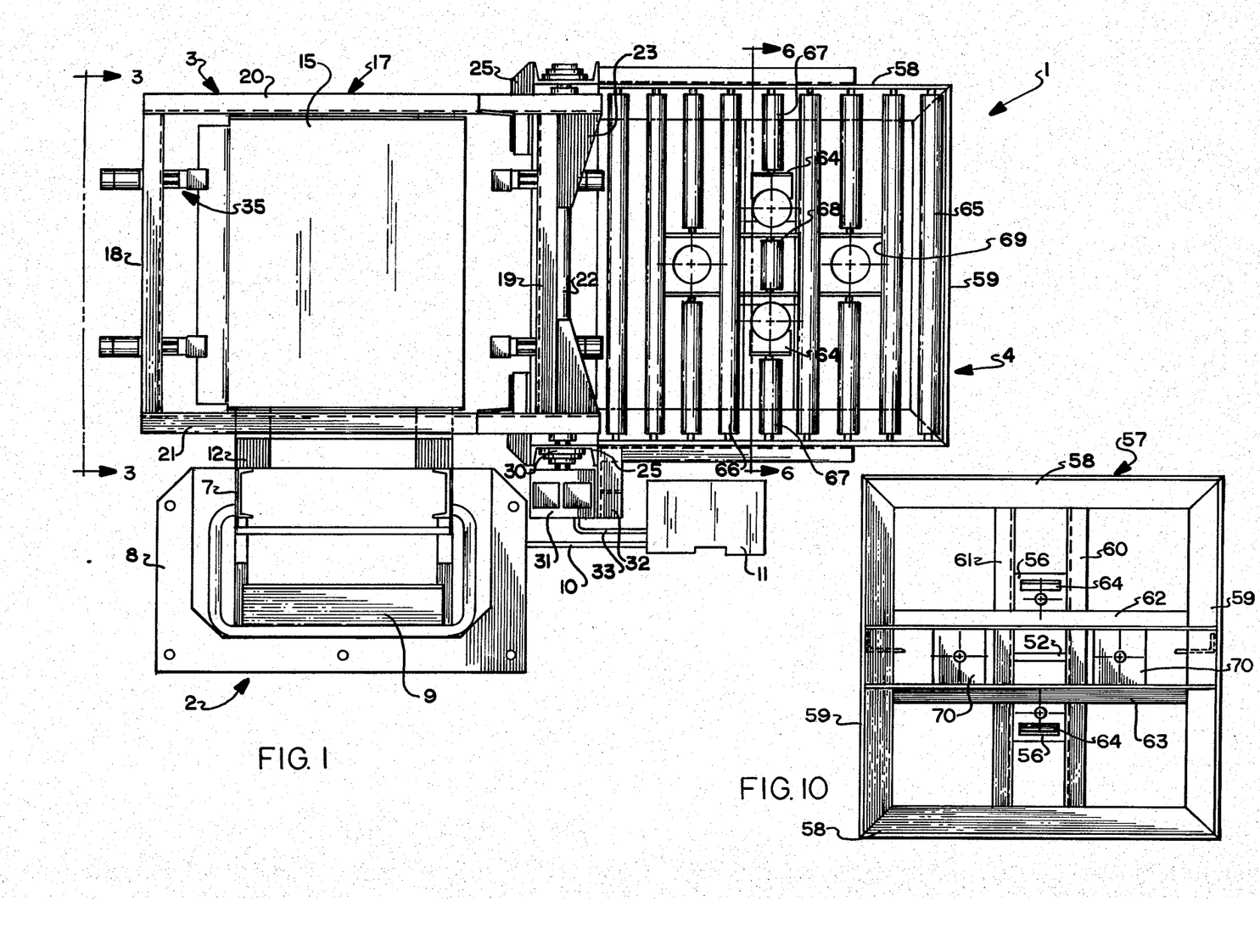
FIG. 1 is a top plan view of the improved cheese unloading machine.
FIG. 10 is a top plan view of the roller mounting table frame with the rollers removed.

Shaft 22 is rotatably mounted in bearings 30 which are mounted on the upper ends of vertical support 24 and 25, and is rotated by a linear rotary actuator 31. Actuator 31 is mounted on vertical support 24 by a bracket 32 as shown in FIGS. 1 and 3 and is connected to control cabinet 11 by a hydraulic line 33. Actuator 31 may be of the type distributed under the trademark Flow-Tork Model No. 300000 distributed by Flow-Tork Incorporated of Orrville, Ohio. Frame 17 which is firmly connected with shaft 22, will rotate with the shaft when the shaft is rotated by actuator 31.

A pair of container guide channels 16 (FIGS. 1, 2 and 3) are mounted by brackets 29 to cross channels 26 and 34 and to stabilizing channels 28 for facilitating the loading of a plurality of cheese-filled containers 15 onto lift platform 13 and for maintaining them in alignment when being raised vertically by elevator 9 for subsequent engagement and transfer by clamping frame assembly 3.

Figure 8:
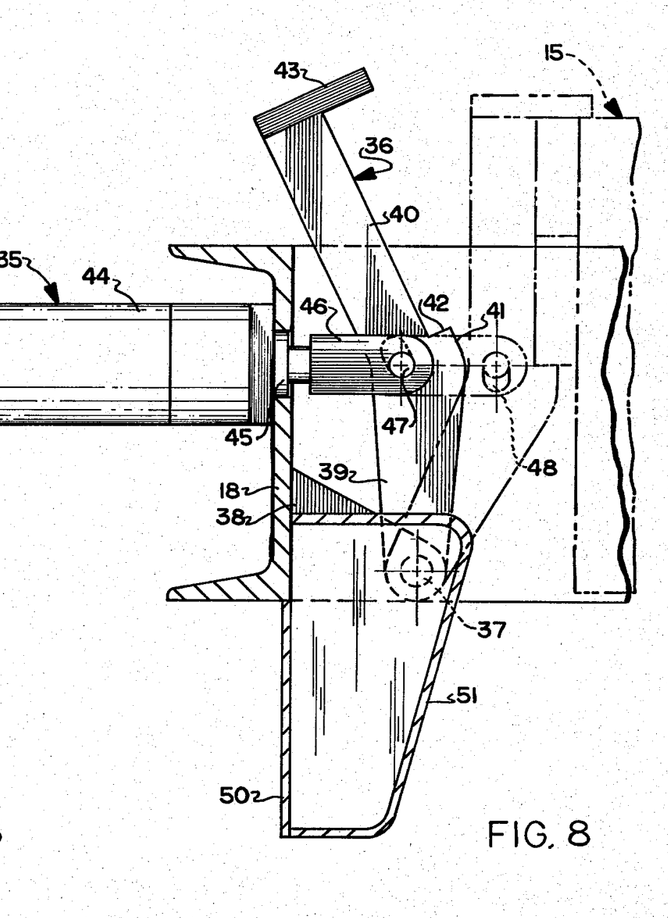
FIG. 8 is an enlarged fragmentary view, portions of which are in section, showing one of the pressure actuated clamps of the improved cheese unloading machine.

In accordance with another feature of the invention, a plurality of clamps, each of which is indicated generally at 35, are mounted on horizontal frame end members 18 and 19. A spaced pair of clamps 35 are mounted on each of the frame members 18 and 19. Referring specifically to FIG. 8, each clamp 35 includes a clamping lever 36 which is pivotally mounted at one end by a pin 37 to a bracket 38 which extends outwardly from end frame members 18 and 19. Each lever 36 has an angled configuration with a lower portion 39 and an upper portion 40 which join at a pressure zone 41 and a shoulder 42. A flange 43 is formed on and extends outwardly from the extending swinging end of upper lever portion 40. Lever 36 is pivotally moved by a pressure actuated, preferably pneumatic, cylinder 44. Piston rod 45 of cylinder 44 is connected by a clevis 46 to a pin 47 which is located in a slot 48 formed in lever 36 adjacent clamping zone 41. A guide bracket 50 is mounted below and adjacent to each clamp 35 having a tapered surface 51 to assist in guiding a cheese container 15 into proper position adjacent clamps 35 prior to the clamps being actuated to grip container 15.

Figure 2:
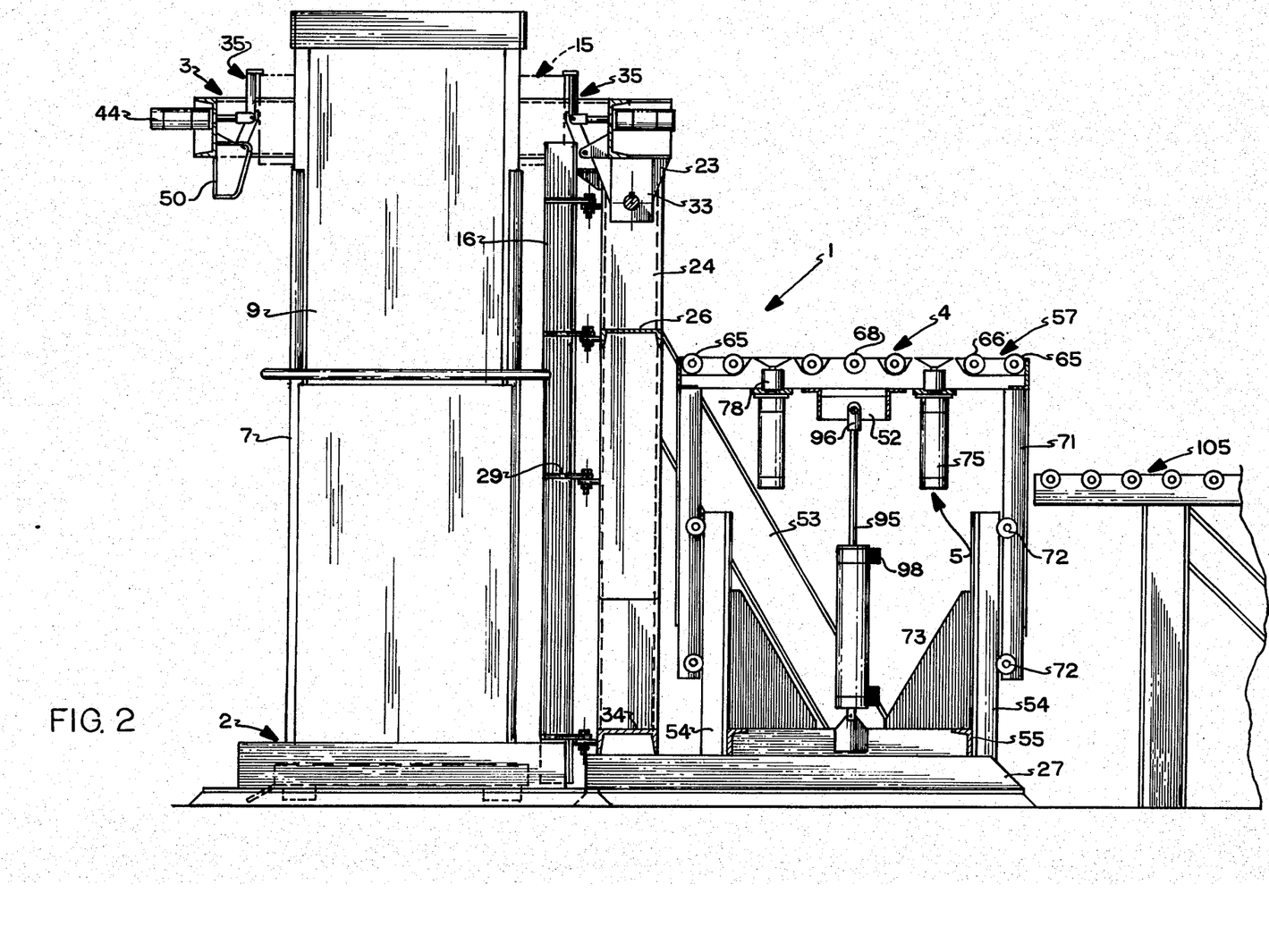
FIG. 2 is a side elevatonal view, portions of which are in section, of the improved cheese unloading machine of FIG. 1.
Figure 3:
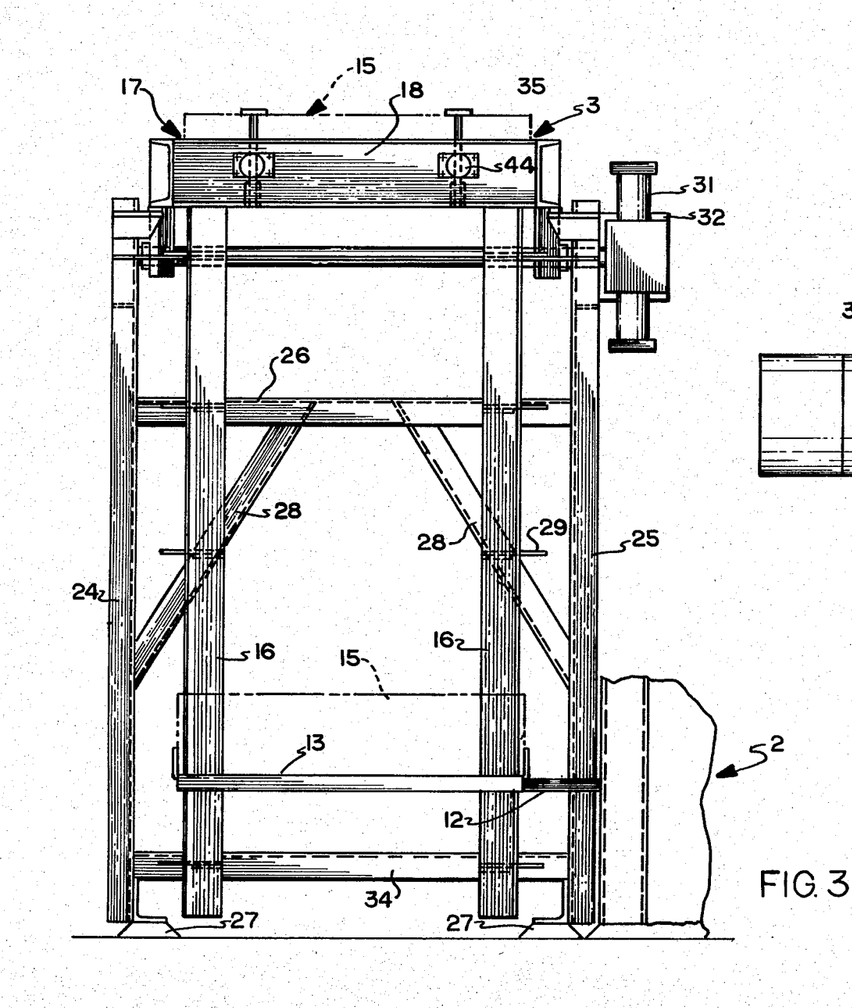
FIG. 3 is a fragmentary end elevational view looking in the direction of arrows 3—3, FIG. 1.

Movable conveyor assembly 4 (FIGS. 4–6) includes a base formed by the continuation of spaced horizontal channels 27 on which vertical supports 24 and 25 are mounted, which are reinforced by a pair of diagonally extending channels 53 (FIGS. 2 and 9). A vertically movable roller table indicated generally at 57, is movably mounted on a pair of horizontally spaced vertically extending guide rails 54. Guide rails 54 are mounted on a pair of horizontal cross channels 55 which in turn are mounted on base channels 27.

Figure 5:
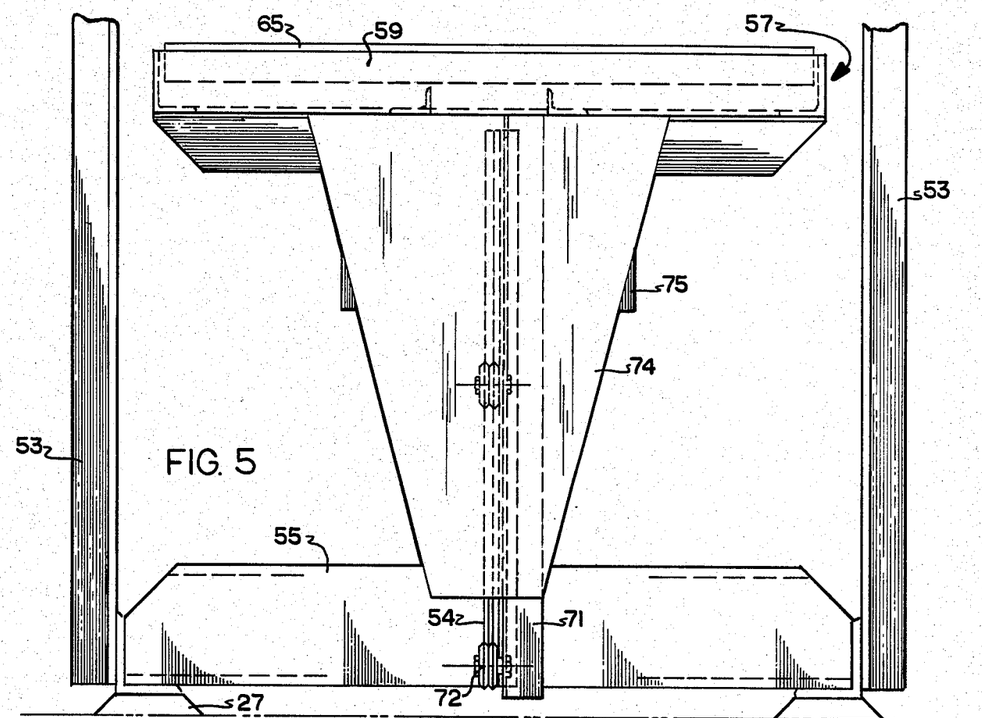
FIG. 5 is a fragmentary elevational view of the movable conveyor assembly looking in the direction of arrows 5—5, FIG. 4.

Guide rails 54 are engaged by a plurality of guide wheels 72 which are mounted on a pair of vertical legs 71 which are mounted centrally on the ends of roller table 57 and extend downwardly therefrom. Two guide wheels 72 are mounted in a spaced relationship on each leg 71 and are engaged with guide rails 54 to vertically movably mount roller table 57 on guide rails 54. Guide rails 54 preferably have triangular-shaped reinforcing plates 73 extending between and attached to rails 54 and a centrally located channel 92. Another pair of triangular-shaped reinforcing plates 74 are mounted on vertical legs 71 and are connected to the frame of roller table 57 as shown in FIG. 5.

Figure 4:
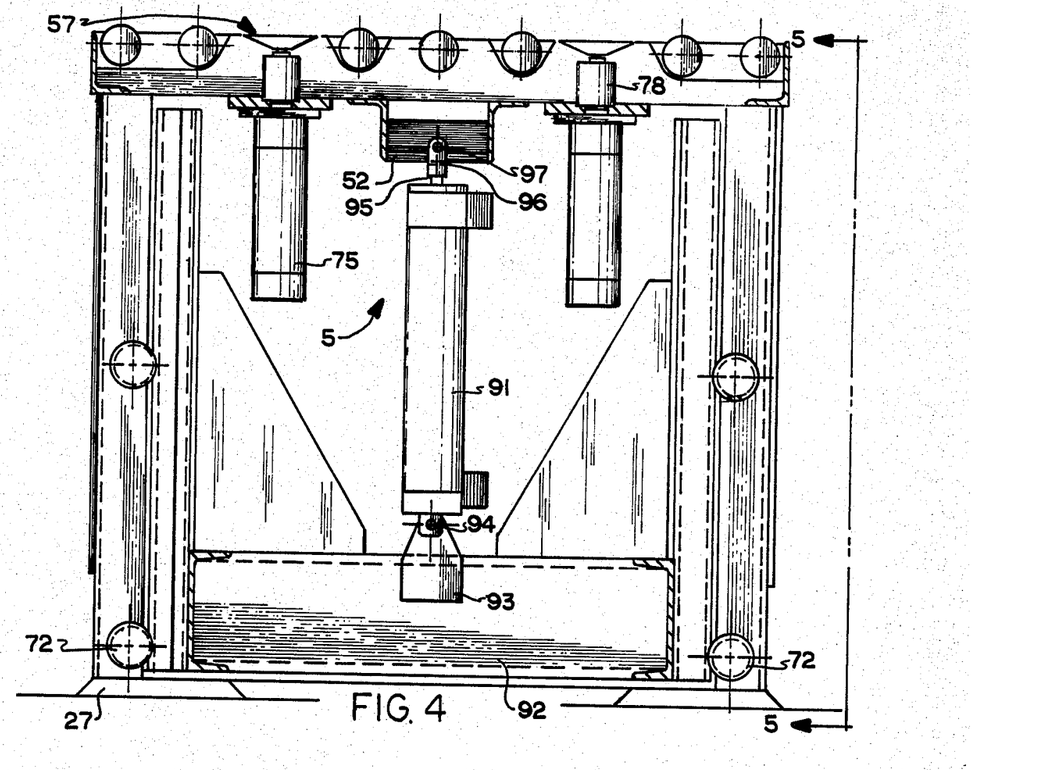
FIG. 4 is an enlarged elevational view, portions of which are in section, of the right-hand end portion of FIG. 2, showing the movable conveyor assembly in a lowered position.
Figure 6:
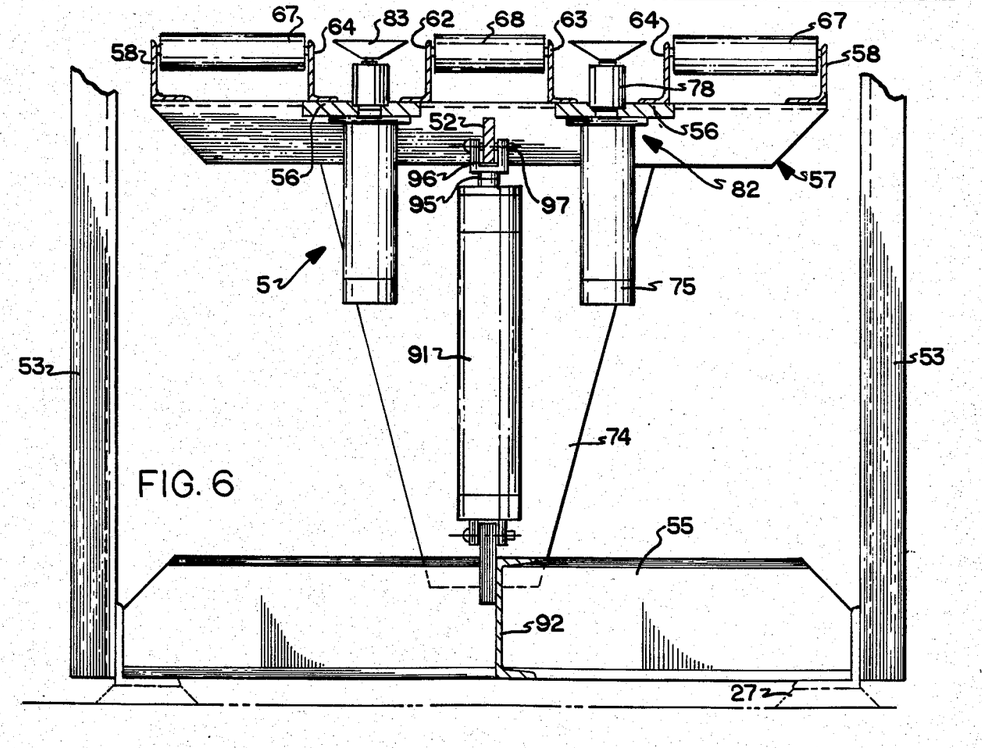
FIG. 6 is an enlarged sectional view taken on lines 6—6, FIG. 1 with the movable conveyor assembly shown in lowered position.

Roller table 57 has a rectangular configuration (FIG. 10) formed by a pair of spaced, parallel roller mounting channels 58, and a pair of spaced, parallel end channels 59. Two pairs of cross channels 60–61 and 62–63 extend between frame member pairs 58 and 59, respectively. A pair of stub channels 64 are located between channels 60 and 61 and are mounted on a pair of plates 56 which are attached to and extend between channels 60 and 61 (FIGS. 4 and 6). A vertical plate 52 is mounted on and extends between the vertical leg of channels 60 and 61.

Referring to FIG. 1, a plurality of spaced rollers 65 are rotatably mounted on roller table 57 and extend throughout the transverse length of table 57 between spaced channels 58. Six such rollers 65 are shown in the drawings. Four shorter rollers 66 are rotatatly mounted on and extend between outer channels 58 and inner channels 62 and 63. Two additional smaller rollers 67 are located at the middle of roller table 57 and extend between frame members 58 and stub channels 64. A single stub roller 68 is mounted on and extends between channels 62 and 63. These different size rollers and the mounting arrangement thereof form four openings 69 located in the central area of conveyor table 57. A pair of plates 70 is mounted on and extend between channels 62 and 63 (FIG. 10) and are located beneath two of the openings 69 as are plates 56.

Figure 7:
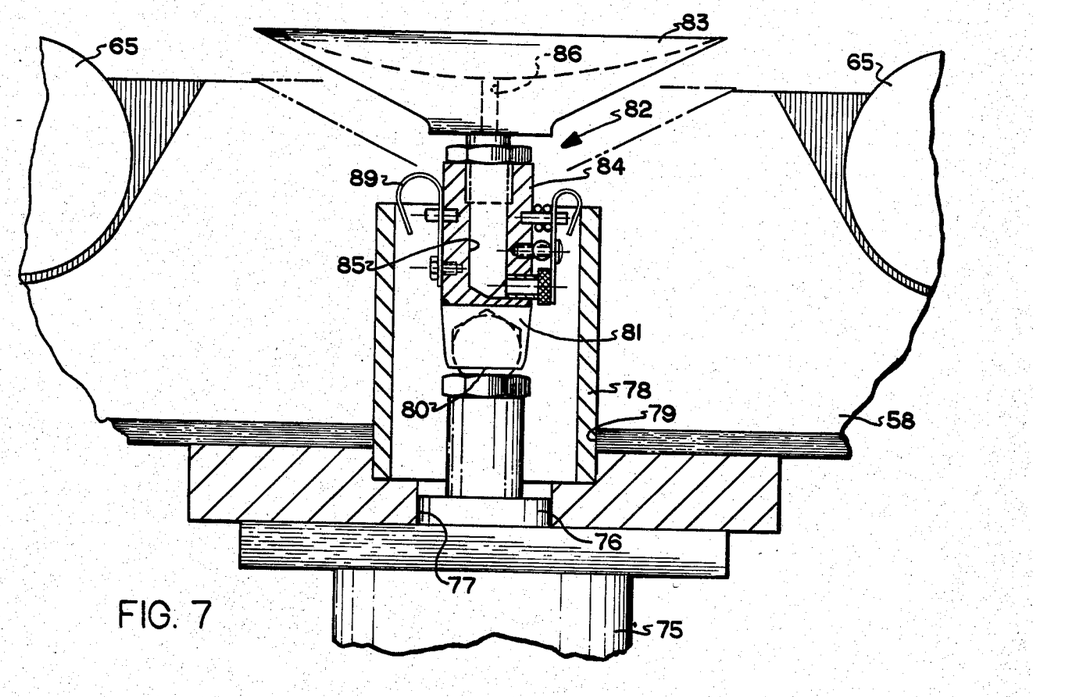
FIG. 7 is an enlarged fragmentary view, portions of which are in section, showing one of the cheese extractor mechanisms of the improved cheese unloading machine.

In accordance with another feature of the invention, cheese extractor mechanism 5 includes a plurality of pneumatically actuated cylinders 75 (FIGS. 4, 6 and 7), each of which is mounted on a plate 70 or on a plate 56 beneath roller table openings 69. Cylinders 75 are connected by appropriate pneumatic lines (not shown) to control cabinet 11. Referring to FIG. 7, each cylinder 75 has a stepped piston rod 76 which extends through an opening 77 formed in either plate 56 or plate 70 and projects into a sleeve 78 which is mounted in a larger opening 79 formed in plates 56 and 70. A ball 80 is mounted on the outer end of each piston rod 76 and is movably received within a socket 81 which is mounted on the bottom of a suction cup assembly, indicated generally at 82.

Each suction cup assembly 82 includes a suction cup 83 which is mounted on a sleeve 84 that is connected to socket 81. Sleeve 84 is formed with an air inlet duct 85 which aligns with an air inlet opening 86 formed in suction cup 83. A vacuum is drawn on suction cup 83 through openings 85 and 86 by a vacuum pump (not shown) which is controlled by appropriate control mechanisms located in cabinet 11. The swivel connection provided by socket 81 and ball 80 permits suction cup 83 to move a limited number of degrees in various directions so as to properly align with the top surface of a block of cheese 88 (FIG. 11) contained within container 15 in order to provide an effective seal therewith for removing the cheese from container 15.

An annular seal 89 is mounted on sleeve 84 of suction cup assembly 82 and is engaged with sleeve 78 to prevent dirt and other impurities from entering sleeve 78 and affecting the operation of cylinder 75 and the movement of piston rod 76. Four such cylinders 75 are arranged in a diamonded configuration as shown in FIG. 1 in the central area of roller table 57 corresponding to roller table openings 69.

A hydraulically actuated cylinder 91 is pivotally mounted on cross channel 92 (FIGS. 4 and 6) by a bracket 93 and pivot pin 94. Piston rod 95 of cylinder 91 is connected by a clevis 96 and a pin 97 to plate 52 which as set forth above extends between the downwardly extending legs of cross members 60 and 61 of roller table 57.

The operation of improved cheese unloading machine 1 is best understood and described with respect to FIGS. 1, 2 and 9. A plurality of cheese containers 15, each of which contains a block of cheese 88 as shown in FIG. 11, are delivered by a forklift truck or similar transport mechanism and placed on elevator platform 13. Movable conveyor assembly 4 will be in the cheese receive position of FIG. 2 in which clamping frame 17 is located above platform 13. Actuation of the appropriate controls in cabinet 11 by a workman will energize elevator 9 of lift mechanism 2 vertically raising platform 13.

Upon the topmost container 15 reaching a position as shown in dot dash lines in FIGS. 2 and 3, a photoelectric sensor, limit switch or similar detecting device will automatically actuate air cylinders 44 of clamps 35. Piston rods 45 will move outwardly from cylinders 44 and will pivot clamping levers 36 toward container 15 forcing clamping zones 41 tightly against opposite sides 100 of container 15. Shoulders 42 of clamping levers 36 will be located just beneath a pair of runners 101 which are mounted on container sides 100. Lever flanges 43 will be located adjacent to stop edges 102 of container sides 100.

After the four clamps 35 have reached their clamping position against container 15 as shown by dot dash lines in FIG. 8, the automatic control cycle will then energize linear actuator 31. Actuator 31 will rotate shaft 22 180° which will move clamping frame assembly 3 and clamped container 15 through a vertical arc of 180°, as shown by arrow A in FIG. 9, from the horizontal cheese load position of FIG. 2 to the horizontal cheese discharge position of FIG. 9. Shoulders 42 and flanges 43 formed on clamping levers 36 prevent container 15 from slipping out of the clamping engagement exerted by clamping zones 41 during the movement of containers 15 between the cheese receive and cheese discharge positions.

After clamping frame assembly 3 together with clamped container 15, have reached the cheese discharge position of FIG. 9, movable conveyor assembly 4 is actuated whereupon roller table 57 will be moved vertically upwardly by hydraulic cylinder 91. Table 57 moves upwardly by guide wheels 72 rolling along vertical guide rails 54. Appropriate sensing means, such as magnetic sensors 98 on hydraulic cylinder 91, will stop table 54 at the desired vertical height immediately beneath cheese block 88 which is now exposed through the heretofore open top 103 of container 15 which now is an open bottom due to the inversion of container 15. Pneumatic cylinders 75 of cheese extractor mechanism 5 then are actuated forcing suction cup assemblies 82 upwardly with suction cups 83 pressing against the exposed top surface 104 of cheese block 88 which usually will be contained in a tough plastic wrap. A vacuum then is drawn on the interior of suction cups 83 securely clamping the same to the cheese. The pneumatic pressure on cylinders 75 then is reversed retracting pistons 76 inwardly toward the cylinders which will withdraw cheese block 88 from within container 15. The cheese block will be supported by rollers 65–68 of roller table 57 since the suction cups 83 will move below the top of the rollers as shown in FIG. 7 when in their retracted positions. Roller table 57 then is lowered by retraction of hydraulic cylinder piston rod 95 into cylinder 91 (FIG. 9) until roller table 57 is generally level with the top of a transfer conveyor 105 located adjacent to improved cheese unloading machine 1. A workman need only roll the removed block of cheese along rollers 65–68 of table 57 and onto transfer conveyor 105 from where it then can be transferred to another processing station.

Immediately upon removal of cheese block 88 from within container 15 by the retraction of suction cups 83, linear actuator 31 is reenergized in the reverse direction, rotating shaft 22, in a counterclockwise direction (FIG. 9), and correspondingly clamping frame assembly 3 through the previously transversed 180° vertical arc from the position of FIG. 9 back to the cheese receive position of FIG. 2 for the start of the next unload cycle.

Accordingly, the improved cheese unloading machine is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved cheese unloading machine is constructed and used, the characteristics of the construction, and the new advantageous, new and useful results obtained; the new and useful structures, devices, elements, arrangements, parts, and combinations, are set forth in the appended claims.

What is claimed is:

1. A machine for removing blocks of cheese from a container having an open top, said machine including:
   (a) clamp means for gripping a container having a block of cheese therein;
   (b) means for inverting the clamp means and a container gripped thereby whereby the open top of the container becomes the bottom of the container;
   (c) extractor means including a plurality of suction cups for removing the cheese through the inverted open top of the container; and
   (d) means for receiving the cheese upon removal from the container by the extractor means, said cheese receiving means including a movable conveyor located below the container when said container is in an inverted cheese discharge position, said conveyor having a horizontal frame and a plurality of spaced rollers rotatably mounted thereon, and the suction cups being mounted on the conveyor and moved vertically between certain of the rollers for engaging the cheese when the conveyor is moved vertically to a position adjacent to and beneath the inverted open top of the container for extracting the cheese from an inverted container and for depositing said removed cheese on the conveyor rollers upon downward vertical movement of the conveyor.

2. The machine defined in claim 1 in which lift means is located beneath the clamp means for raising a cheese-filled container into position adjacent the clamp means for engagement by said clamp means.

3. The machine defined in claim 2 in which the lift means includes a base adapted to hold a plurality of cheese-filled containers in a vertical stacked relationship; and in which said base is raised vertically by fluid pressure actuated cylinders.

4. The machine defined in claim 1 in which the clamp means is two pairs of spaced clamps movable into clamping engagement with the container by fluid pressure actuated cylinders.

5. The machine defined in claim 1 in which the means for inverting the clamped container is a frame which is pivotally mounted on a vertical support; in which the clamp means is mounted on the frame; and in which a power-driven mechanism pivotally moves said frame and container clamped thereon by the clamping means through a vertical arc of 180° to invert said container.

6. The machine defined in claim 1 in which the conveyor frame includes a plurality of vertical legs having guide wheels mounted thereon; and in which said wheels are movable along vertically extending rails for moving the conveyor between a raised cheese receive position and a lowered position.

7. The machine defined in claim 1 in which the conveyor frame is moved vertically by a fluid pressure actuated cylinder.

8. The machine defined in claim 1 in which the suction cups are mounted on swivels and are moved vertically by fluid pressure actuated cylinders.

9. The machine defined in claim 5 in which the pivotally mounted frame extends in cantilever fashion from the vertical support.

10. The machine defined in claim 9 in which the frame is pivotally mounted on a vertical support by a shaft; and in which said shaft is rotated 180° by a linear rotary actuator.

11. The machine defined in claim 1 in which the clamp means includes a plurality of clamping mechanisms, each of which has a pivotally mounted lever and a pressure actuated cylinder for moving said lever into and out of clamping engagement with a container.

12. The machine defined in claim 11 in which each of the clamping levers has a clamping zone which engages a container, and a shoulder and an end flange which assist in retaining a clamped container in the clamping means.

13. A machine for removing blocks of cheese from a container having an open top, said machine including:
   (a) clamp means for gripping a container having a block of cheese therein;
   (b) means for inverting the clamp means and a container gripped thereby whereby the open top of the container becomes the bottom of the container;
   (c) extractor means including a plurality of suction cups located beneath the inverted open top of the container and engageable with the cheese for removing the cheese through the inverted open top of the container upon relative vertical movement between the cheese and suction cups;
   (d) means located beneath the inverted open top of the container for receiving the cheese;
   (e) said cheese receiving means includes a vertically movable conveyor;
   (f) said suction cups are mounted on said vertically movable conveyor for movement therewith and relative thereto;
   (g) wherein the suction cups engage the cheese and deposit the cheese onto the conveyor.

14. The machine defined in claim 13 in which the conveyor includes a horizontal frame and a plurality of spaced rollers rotatably mounted thereon; and in which the suction cups are moved vertically between certain of the rollers for engaging the cheese.

* * * * *